Patented May 17, 1927.

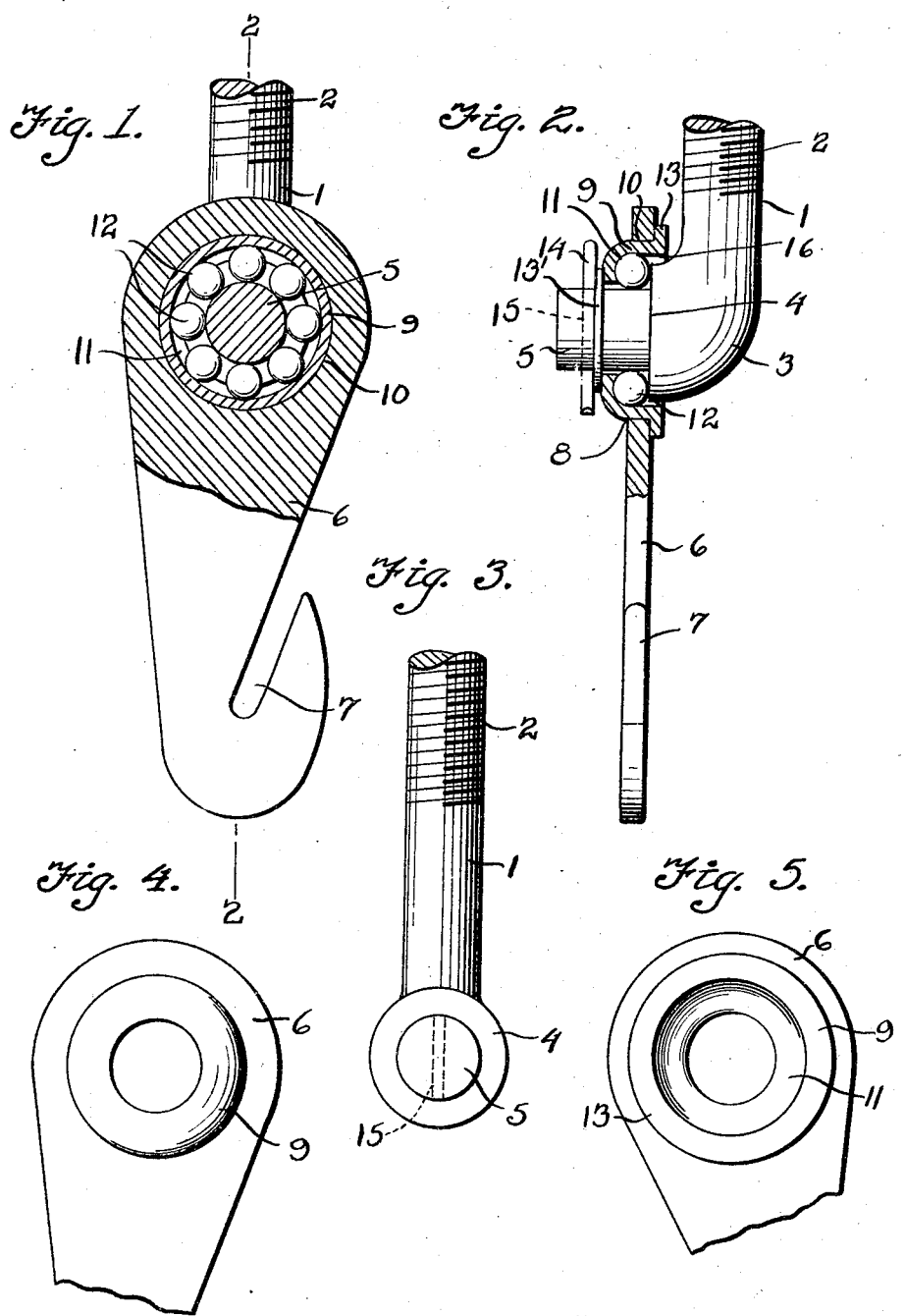

1,629,363

UNITED STATES PATENT OFFICE.

WALTER ROSS, OF LOUISVILLE, KENTUCKY.

BALL-BEARING PORCH-SWING HOOK.

Application filed April 9, 1926. Serial No. 100,919.

In the present invention, the same being a ball bearing porch swing hook, it is the purpose to provide a device of this kind, wherein means are afforded to reduce the friction between a trunnion of a hanger and an eye at one end of the hook, from which swing strands or ropes are suspended, thereby avoiding squeaking and the like during the movements of the swing.

Another purpose is to provide an improved ball bearing porch swing hook, including means for retaining the eye of the hook on the trunnion of the hanger, said means consisting of a washer and a cotter key operatively connected with the trunnion to retain the eye (which is provided with a raceway) in engagement with anti-frictional means.

The invention comprises further features and the combination of parts, as will be hereinafter set forth, shown in the drawings, and claimed.

In the drawings:

Figure 1 is a sectional view through an improved ball bearing porch swing hook, showing the eye of the hook, as mounted upon the trunnion of a hanger.

Figure 2 is a sectional view on line 2—2 of Figure 1.

Figure 3 is a view in elevation of the hanger.

Figure 4 is a view in side elevation of the eye end of the hook.

Figure 5 is a view in elevation of the eye end of the hook, showing the inner face, to better illustrate the raceway.

Referring to the drawings, 1 designates a hanger, the shank of which is threaded as at 2 for fastening the hanger into a stationary support, such as the ceiling of a porch. The lower end of the shank is turned laterally, provided with an enlargement 3 at the junction of the lateral portion and is provided with a shoulder 4 and beyond the shoulder with a trunnion 5.

Operatively mounted on the trunnion 5 is a hook member 6, the hook end 7 of which may be connected with swing strands or ropes, not shown. The other end of the hook member has an opening 8 in which a collar 9 is secured at 10 in any suitable manner, either by electrically welding, brazing, or otherwise.

This collar 9 is dished and is provided with a raceway 11 cooperating with anti-frictional ball bearings 12 to retain them in contact with the shoulder 4, whereby the collar may have freedom of movement, and thereby reduce friction to a minimum. The collar where it is electrically welded, or otherwise fastened in the opening of the hook member, is provided with a flange 13 to limit its insertion into the opening 8, prior to the welding process for fastening the collar to the hook member. As shown, the collar is mounted in position, so that the raceway may engage with the ball bearings 12, after which a washer 13' is fitted to the trunnion to retain the collar in position. A cotter key 14 is inserted through a transverse opening 15 near the end of the trunnion, not only securing the washer in position, but also insuring securement of the collar in place in engagement with the ball bearings.

Obviously, as the strands or ropes of a swing oscillate the collar may have freedom of movement on the ball bearings, and thereby relieve squeaking and the like as the swing oscillates.

Obviously, the anti-frictional ball bearings may be easily lubricated by injecting a lubricant into the raceway at the point indicated by the numeral 16.

The invention having been set forth, what is claimed is:

1. A ball bearing hook comprising in combination a threaded depending hanger, a reduced laterally offset trunnion defining a shoulder at the inner end of the trunnion, a hook member provided for the collar having a raceway operatively engaged with the trunnion, anti-frictional ball bearings between the raceway and the shoulder, and means carried by the trunnion to retain the collar in position.

2. In a ball bearing hook, the combination with a depending hanger provided with a lateral trunnion and a shoulder adjoining the trunnion, of a hook member provided with a hook at one end and an eye at the other end having a raceway, the eye operatively mounted upon the trunnion, anti-frictional members between the raceway and the shoulder, the wall of the raceway overlying the shoulder and acting as means to guide lubricant to the anti-frictional member, a washer on the trunnion, a cotter key passing transversely through the trunnion engaged with the washer to retain it against the wall of the eye, to retain the raceway against the anti-frictional members.

In testimony whereof I affix my signature.

WALTER ROSS.